United States Patent
Rigney et al.

(10) Patent No.: US 6,502,304 B2
(45) Date of Patent: Jan. 7, 2003

(54) TURBINE AIRFOIL PROCESS SEQUENCING FOR OPTIMIZED TIP PERFORMANCE

(75) Inventors: Joseph David Rigney, Milford, OH (US); William Scott Walston, Mason, OH (US); Richard John Grylls, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 09/855,444

(22) Filed: May 15, 2001

(65) Prior Publication Data

US 2002/0170176 A1 Nov. 21, 2002

(51) Int. Cl.[7] ............................................... B23P 15/00
(52) U.S. Cl. .................................. 29/889.21; 29/889.22
(58) Field of Search ............................... 29/889, 889.1, 29/889.2, 889.21, 889.22; 415/115, 116; 427/142

(56) References Cited

U.S. PATENT DOCUMENTS

| | | | | |
|---|---|---|---|---|
| 4,578,942 A | * | 4/1986 | Weiler .......................... | 415/134 |
| 4,784,569 A | * | 11/1988 | Sidenstick et al. ........ | 415/173.1 |
| 4,802,828 A | | 2/1989 | Rutz et al. ................... | 416/241 |
| 4,854,196 A | | 8/1989 | Mehan ....................... | 76/110 R |
| 5,048,183 A | * | 9/1991 | Cang et al. .................. | 228/119 |
| 5,059,095 A | | 10/1991 | Kushner et al. ......... | 416/241 B |
| 5,064,343 A | * | 11/1991 | Mills ............................ | 415/115 |
| 5,191,711 A | | 3/1993 | Vickers et al. ........... | 29/889.21 |
| 5,203,673 A | * | 4/1993 | Evans .......................... | 415/10 |
| 5,211,534 A | * | 5/1993 | Catlow ..................... | 415/170.1 |
| 5,212,940 A | * | 5/1993 | Glover ....................... | 415/115 |
| 5,263,816 A | * | 11/1993 | Weimer et al. ............. | 415/131 |
| 5,348,446 A | | 9/1994 | Lee et al. ................ | 416/241 R |
| 5,448,828 A | | 9/1995 | Willems et al. ............ | 29/899.1 |
| 5,584,663 A | | 12/1996 | Schell et al. ............ | 416/241 R |
| 5,603,603 A | | 2/1997 | Benoit et al. ............ | 415/173.4 |
| 5,667,358 A | * | 9/1997 | Gaul ......................... | 415/173.1 |
| 5,667,359 A | * | 9/1997 | Huber et al. .............. | 416/96 A |
| 5,779,436 A | * | 7/1998 | Glezer et al. ................ | 415/115 |
| 5,791,872 A | * | 8/1998 | Owen ....................... | 415/173.2 |
| 5,997,248 A | | 12/1999 | Ghasripoor et al. ..... | 415/173.4 |
| 6,042,880 A | * | 3/2000 | Rigney et al. ............. | 29/889.1 |
| 6,086,328 A | * | 7/2000 | Lee ........................... | 415/115 |
| 6,102,656 A | * | 8/2000 | Nissley et al. ........... | 415/174.4 |
| 6,190,129 B1 | * | 2/2001 | Mayer et al. ............... | 416/235 |
| 6,203,847 B1 | * | 3/2001 | Conner et al. ............. | 29/889.1 |
| 6,273,671 B1 | * | 8/2001 | Ress, Jr. ........................ | 415/1 |
| 6,274,193 B1 | * | 8/2001 | Rigney et al. ............... | 427/140 |
| 6,296,447 B1 | * | 10/2001 | Rigney et al. ............. | 415/217.1 |
| 6,332,926 B1 | * | 12/2001 | Pfaendter et al. .......... | 118/504 |
| 6,393,331 B1 | * | 5/2002 | Chetta et al. ............... | 700/104 |
| 6,401,460 B1 | * | 6/2002 | Xia .............................. | 415/14 |

* cited by examiner

*Primary Examiner*—I. Cuda-Rosenbaum
(74) *Attorney, Agent, or Firm*—David L. Narciso; McNees, Wallace & Nurick (57) ABSTRACT

Optimized tip performance for turbine airfoils is obtained through a sequenced manufacturing process. The turbine airfoils are assembled into the dovetail slots of a turbine disk. The tips of the turbine airfoils assembled in the turbine disk are then measured to determine the turbine airfoils that do not have adequate tip clearance. The tips of those turbine airfoils that do not have adequate tip clearance are then machined to obtain adequate tip clearance. Once all the turbine airfoils have adequate tip clearance, environmental coatings and/or thermal barrier coatings are applied to the blade tips.

20 Claims, 5 Drawing Sheets

TURBINE AIRFOIL PROCESS SEQUENCING FOR OPTIMIZED TIP PERFORMANCE

BACKGROUND OF THE INVENTION

The present invention relates generally to a process for manufacturing turbine airfoil or blade components used in gas turbine engines. More specifically, the present invention relates to a process for manufacturing turbine airfoils or blades to limit the rubbing of any coatings that are applied to tips of the turbine airfoils.

Turbine blade materials, typically superalloys, achieve the desired high temperature properties through directional or single crystal solidification as well as by composition. However, one of the consequences of certain alloying elements in composition is inadequate environmental resistance in a gas turbine operating environment.

Components such as turbine blades, operating in the gas path environment of gas turbine engines are subjected to significant temperature extremes and degradation by the oxidizing and corrosive environments caused by the hot gases of combustion. Protective coating systems, such as environmental coatings and thermal barrier coating (TBC) systems, are often applied to the external surfaces of these components to protect the bare alloy from this operating environment. In the case of TBC systems, the TBC system also affords the opportunity to improve the efficiency of the engine by permitting an increase in the operating temperatures of the engine. The environmental coating systems are generally comprised of a metallic environmental coating that serves as a bond coat applied to the structural component. When used in a TBC system, an insulating ceramic layer is applied over the environmental coating. Common bond coats or environmental coatings for turbine airfoils and combustor components can be classified into two types, overlay coatings and diffusion aluminide coatings.

Overlay coatings such as MCrAlY type or NiAl based coatings can be applied by physical vapor deposition (PVD) processes such as sputtering, cathodic arc, electron beam, etc., or by plasma spray processes. Coating composition, microstructure and thickness are controlled by the processing parameters. Diffusion aluminide coatings are widely employed in the industry, and can be applied by a range of methods including pack cementation, above-the-pack processing, vapor phase processing, chemical vapor deposition and slurry coating processes. The thickness and aluminum content of the end product coating can be controlled by varying the coating time, coating temperature, the aluminum activity of the coating process and subsequent heat treatments. Often, these coatings are enhanced by including noble metals and/or reactive elements within the coating. To complete the TBC system, the ceramic top coat, typically a yttria stabilized zirconia (YSZ), for rotating turbine airfoils is preferably deposited by electron-beam PVD, although plasma spray processes are widely used for stationary vane and combustor applications. Improvements to TBC systems are constantly under development to permit the airfoil system to which they are applied reach higher operating temperatures or to have a longer operational life at current temperatures.

These coating systems are often applied to fully machined blades that are then assembled into the turbine disks, etc. and then into the final engine assembly. Although machining operations are precise for each component, within prescribed manufacturing tolerances, the stack-up of these manufacturing tolerances in the assembled components of the final engine assembly can result in significant variations. Because of these variations, the tips of the blades often severely rub mating shroud materials during the initial cycles of engine operation. This rubbing causes the removal of the environmental coating and TBC system from the tip areas of the blades, allowing direct exposure of the underlying less oxidation resistant superalloy to hot oxidizing or corrosive gases. The consequence of the removal of the environmental coating from the tip area is a more rapid oxidation of the superalloy causing tip recession. An increase in the clearance between the blade tip and the shroud can also result from these variations and is equally undesirable, as these clearances cause significant loss in engine efficiency and increase engine operating temperatures, further exacerbating the problem. Although the coatings originally applied to these tip areas are designed to withstand the hot oxidizing atmosphere, they are frequently removed because of the imprecise control of the clearances. The removal or partial removal of advanced TBC systems preclude taking full advantage of the improvements afforded by the advanced TBC systems.

U.S. Pat. No. 5,191,711 to Vickers et al. discusses a fixture for placing and holding of compressor blades or turbine blades in their normal "running position." After the blades are placed in their "running position," the tips of the blades can be machined to achieve a uniform tip clearance. Environmental coatings and thermal barrier coating systems are not normally applied to compressor hardware. Thus, it is not surprising that Vickers does not discuss TBC or environmental coatings on the blade tips in general and does not specifically discuss how to maintain the TBC or environmental coatings on the blade tip during operation.

Therefore, what is needed in the art is a process for sequencing the assembly process for turbine blades or airfoils into the turbine engine to limit the extent of tip rubbing and environmental coating removal that causes deterioration of tips of TBC coated turbine engine airfoils during engine operation, while also assuring that there is minimal clearance between the blades and shrouds that could adversely affect engine efficiency.

BRIEF SUMMARY OF THE INVENTION

The present invention discloses several related techniques for processing turbine airfoils or blades to achieve optimal tip performance and reduce the wear or rubbing of thermal barrier coating (TBC) or environmental coatings from the blade tip of the turbine airfoil.

A first method of processing turbine blades to limit removal of applied coatings from tips of the turbine blades includes assembling a plurality of turbine blades into a turbine disk. The blades are dimensionally measured and a set of turbine blades not having appropriate fit-up dimensions is determined. The set of turbine blades not having appropriate fit-up dimensions is then machined to achieve a predetermined fit-up dimension. Afterwards, protective coatings (environmental coatings and TBC systems) are applied to the turbine blades.

A second method of processing turbine airfoils includes assembling a plurality of turbine airfoils onto a turbine disk. Each turbine airfoil assembled on the turbine disk is then measured. The turbine airfoils are then processed as required, using the measurement of each turbine airfoil, to have a length less than that required for appropriate fit-up dimensions. Finally, protective coatings (environmental coatings and TBC systems) are applied to the turbine airfoils in amounts sufficient to achieve the appropriate fit-up dimensions for each turbine airfoil.

A third method of processing turbine blades for appropriate fit-up dimensions includes applying protective coatings to a plurality of turbine blades. The coated turbine blades are then assembled onto a turbine disk. The turbine disk is then assembled into a turbine engine and the turbine engine is run with the blades assembled on the turbine disk. Alternatively, a set of coated turbine blades not having appropriate fit-up dimensions is then determined. The set of coated turbine blades not having appropriate fit-up dimensions have material removed to achieve appropriate fit-up dimensions. Finally, a slurry or other coating is applied to the turbine blade to restore any protective coatings that may have been removed.

The present invention can significantly improve the performance of blade tips by assuring not only proper fit-up of the blade to rotor but also that appropriate coatings are on the proper fitting blade. Consequently, this improvement in blade tip performance can extend the service intervals for engines operating with these blade tips because a high percentage of shop visits are dictated by performance loss and increase in engine gas temperatures due to tip recession that occurs after protective coatings are lost due to early engine excursions. In addition, this improvement in blade tip performance can extend the time period of adequate engine efficiency and improve the repairability of airfoils with TBC bond coats.

One advantage of the present invention is that it provides extended performance capabilities for engines using environmental coatings on turbine airfoils. Another advantage of the present invention is that it provides improved repairability of airfoils following engine use. Still another advantage of the present invention is that existing processes can be used to achieve these improvements. A further advantage of the present invention is that the entire benefit resulting from advanced TBC systems can be utilized after initial engine cycling and break-in. An additional advantage of the present invention is that improved control of fit-up results in improved engine performance from less shroud abrasion and a better seal between the blade tip and the shroud.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE INVENTION

Figure 1:
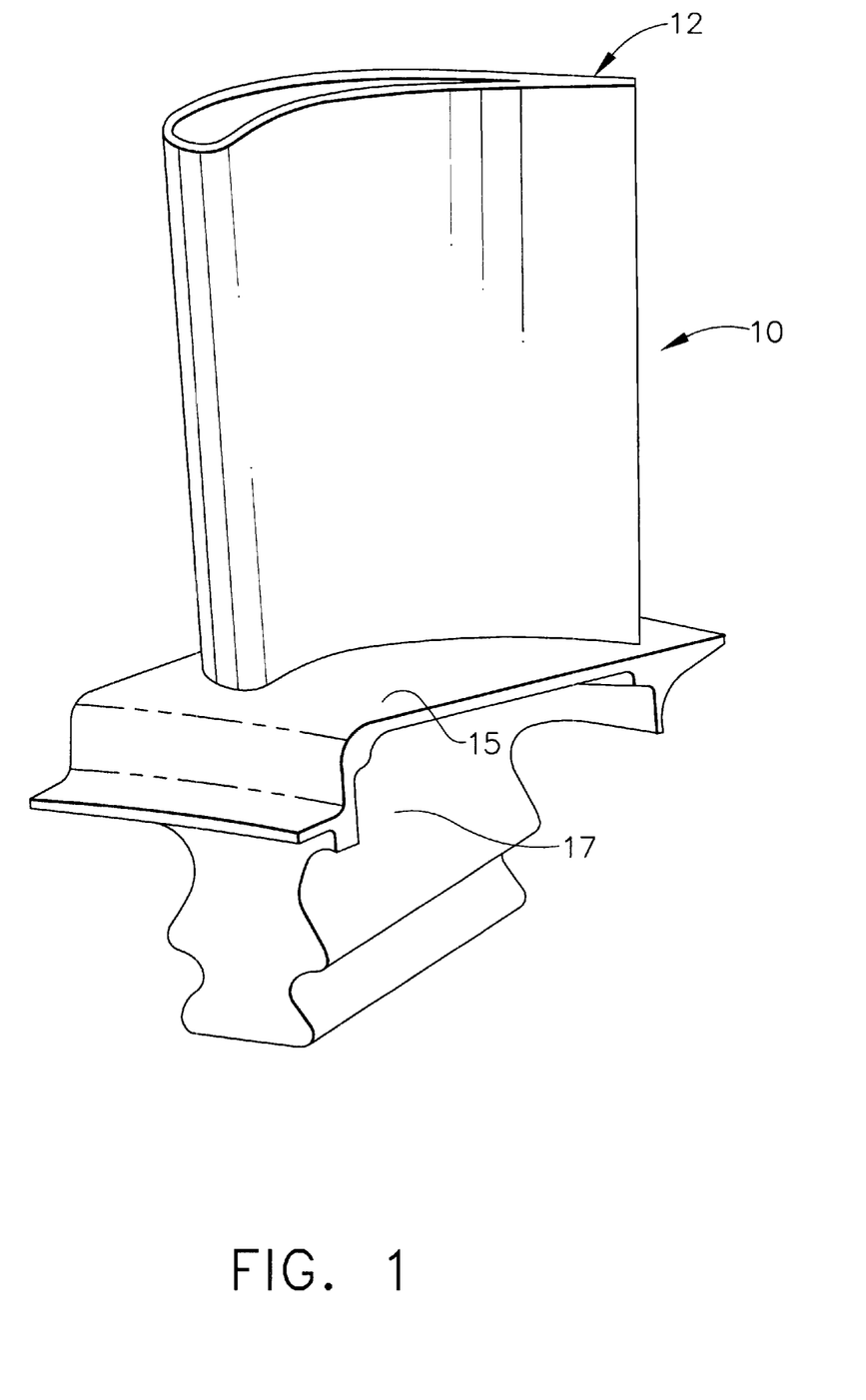
FIG. 1 is a perspective view of a turbine blade and blade tip.

The present invention provides improved techniques for manufacturing or processing turbine blades used in gas turbine engines. A representative turbine blade or airfoil 10 with a corresponding blade tip or squealer tip 12 is illustrated in FIG. 1.

In a first embodiment of the present invention, the turbine blades or airfoils 10 are cast and machined to within manufacturing tolerances using conventional procedures well known in the art. Substrate materials often used in turbine blades or airfoils for aircraft engines may include nickel based superalloys. The alloys may be cast or wrought superalloys. Examples of airfoil substrates are GTD-111, GTD-222, Rene 80, Rene 41, Rene 125, Rene 77, Rene 142, Rene N4, Rene N5, Rene N6, Inconel 706, and Inconel 718.

Figure 2:
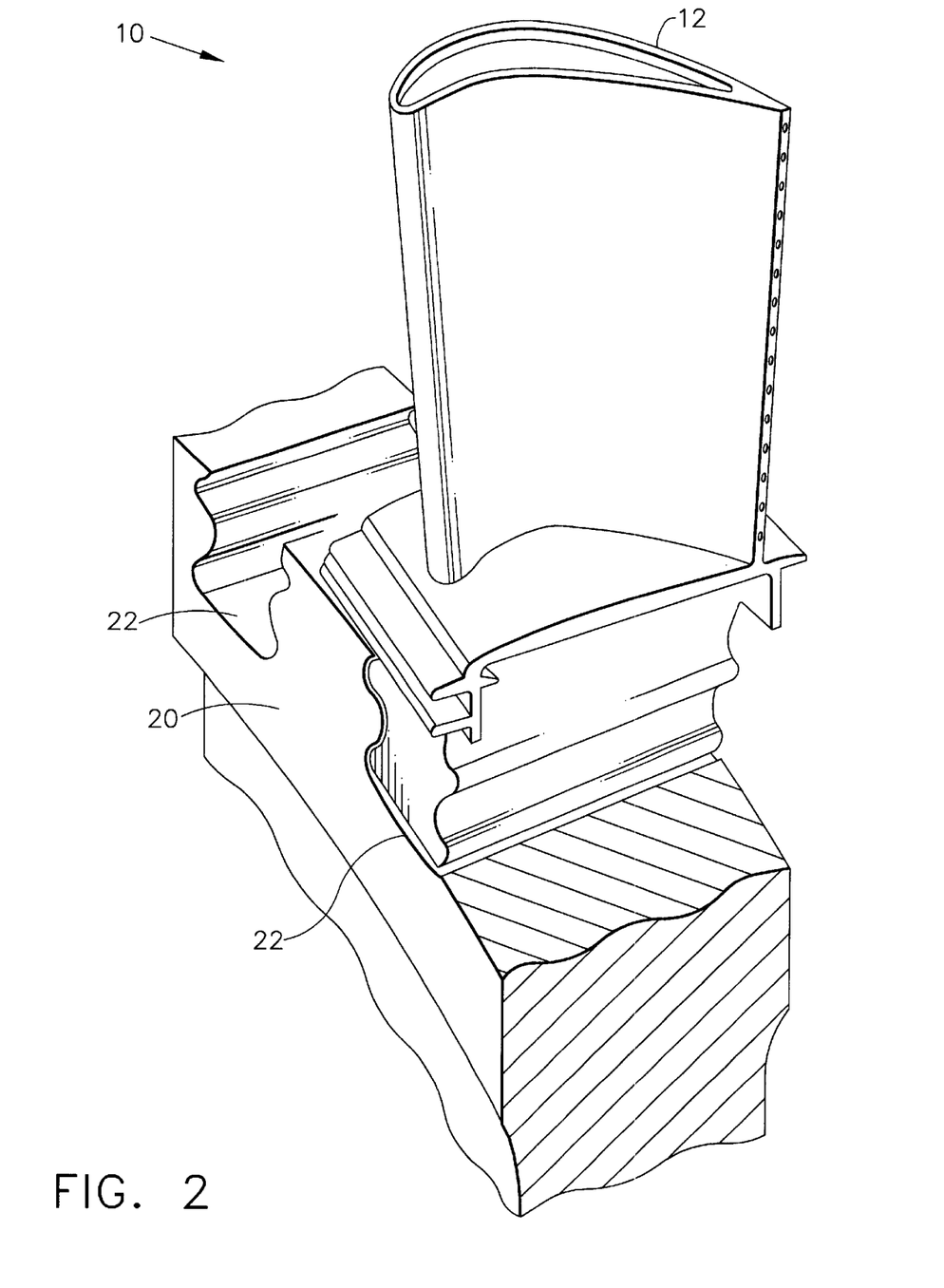
FIG. 2 illustrates a turbine disk and turbine blade.

Next, as shown in FIG. 2, the blades 10 are assembled into corresponding dovetail slots 22 on a turbine disk 20. The blades 10 assembled into the turbine disk 20 are measured for tip clearances using conventional procedures well known in the art. The blades 10 that do not have adequate tip clearance are labeled and recorded for subsequent machining with traceability to their dovetail slot position in the turbine disk 20.

Figure 7:
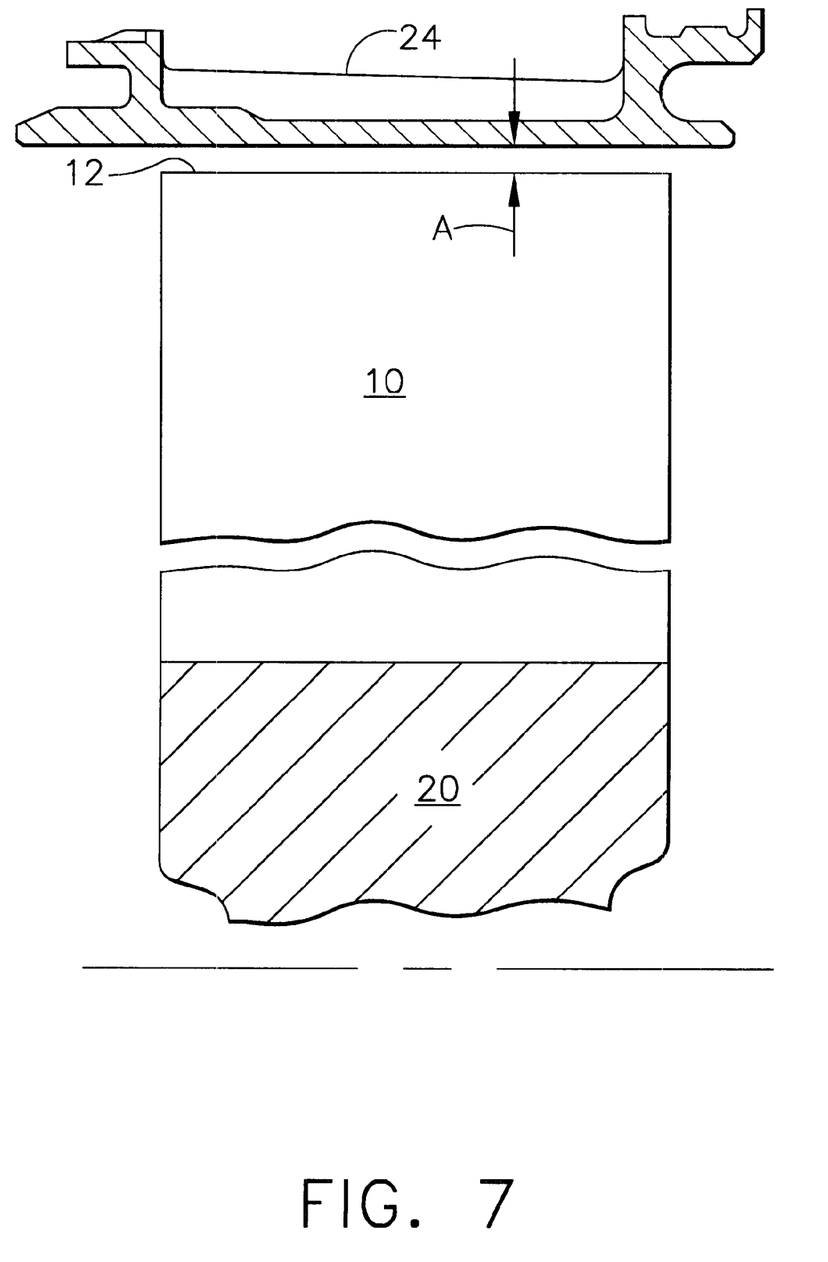
FIG. 7 illustrates the turbine blades and surrounding shroud.

FIG. 7 illustrates diagrammatically adequate tip clearance for the turbine blades 10. Turbine blades 10 are assembled into the turbine disk 20 and assembled into an engine where they are surrounded by a shroud 24 which forms the outer flow path boundary. The distance A between the shroud 24 and the blade tip 12 is the distance that represents the predetermined adequate clearance between the blade 10 and the shroud 24 in a cold engine. The distance A is preferably a positive non-zero value when the gas turbine engine is cold but is made as small as possible for optimal gas turbine engine performance. The distance A is preferably defined as a range of values to account for manufacturing tolerances in the manufacturing specifications of various features of the gas turbine engine components, e.g. the blade 10, the turbine disk 20 and the shroud 24. However, in the situations where the distance A is less than a predetermined adequate tip clearance, or zero, the blade tip 12 will be in frictional contact with the shroud 24 when the engine is at operating temperatures. This situation is the situation described above that leads to the rubbing or wear of TBC or environmental coatings from the blade tip 12 due to frictional contact with the shroud 24.

Figure 3A:
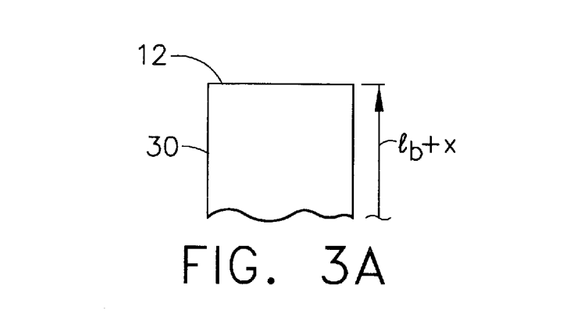
FIGS. 3A–3C illustrate turbine blade measurements in one embodiment of the present invention.
Figure 3B:
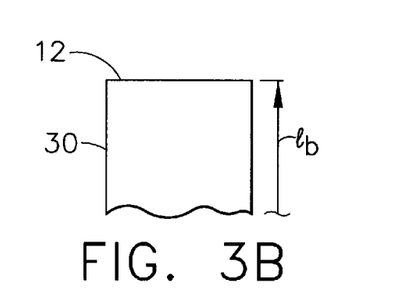
Figure 3C:
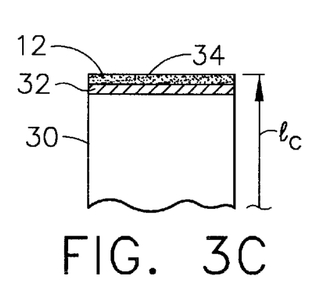

FIGS. 3A–3C illustrate schematically the process used in the first embodiment of the present invention. FIG. 3A illustrates schematically a blade 30 that has been measured and recorded as not having adequate tip clearance, i.e. blade 30 is too long. The blade 30 in FIG. 3A is indicated as having a length of $l_B+x$, where $l_B$ is the predetermined length for a blade 10 assembled in turbine disk 20 to have an adequate tip clearance and x is a length in excess of the predetermined length for the blade 10. Thus, if a blade of length $l_B+x$ is coated and placed into service in an engine, the protective coatings will quickly be removed from the tip. Further, the length of $l_B$ is determined in view of any subsequent application of any oxidation-resistant or protective coating to blade 10. In other words, the length of $l_B$ is determined to be of sufficient length to permit the application of protective coatings of predetermined thickness to blade 10 and still permit blade 10, after receiving the TBC coating system, to maintain an adequate tip clearance.

Next, all the blades 10 are removed from the turbine disk 20. Simultaneously, with the removal of each blade 10 from the turbine disk 20, the location of the blade 10 in the turbine disk 20 is recorded. The blades 10 that were previously labeled and recorded as not having adequate tip clearance will be machined to achieve an adequate tip clearance control. The machining of the blade tips 12 can be accomplished by match grinding, however, the material can be removed from the blade tips 12 by other processes. Each blade 10 is then reassembled into the same dovetail slot 22 in the turbine disk 20 at the same position and orientation as originally assembled using the information recorded when the blades 10 were removed.

Figure 6:
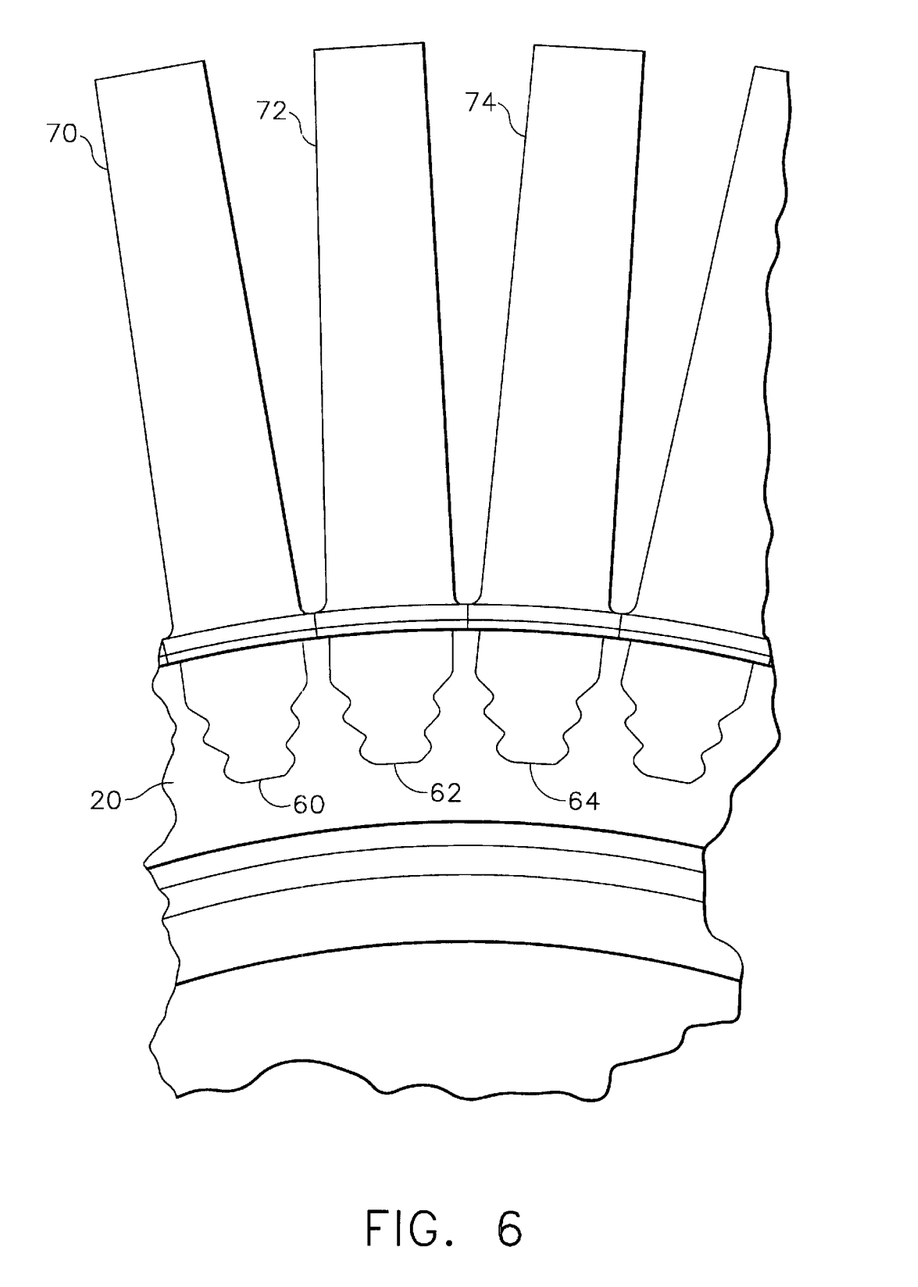
FIG. 6 illustrates schematically a turbine disk with turbine blades.

To further illustrate the disassembly and reassembly of blades 10 from turbine disk 20, FIG. 6 shows a partial cross-section of turbine disk 20 with three dovetail slots 60–64 and three blades 70–74 assembled in the slots. As described above, the blades 70–74 would be measured to determine those blades 70–74 that do not have adequate tip clearance. Next, those blades that do not have adequate tip clearance are labeled, and their measured dimensions recorded. The blades 70–74 are then disassembled from the turbine disk 20 for the machining of the blades 70–74 that do not have adequate tip clearance. To begin disassembly, blade 70 is removed from dovetail slot 60, information matching each blade 70 to a respective dovetail slot 60 is recorded. This disassembly process is then repeated for blades 72, 74, wherein similar information for blades 72, 74 and their respective dovetail slots 62, 64 is recorded. After machining is performed on the blades 70–74 having inadequate tip clearances based on the recorded measured dimensions, the preselected coating system is applied to a preselected thickness consistent with required tip clearances and the reassembly process is started. In the reassembly process, blade 70 is reassembled into dovetail slot 60, blade 72 is reassembled into dovetail slot 62 and blade 74 is reassembled into dovetail slot 64, so that the machined blades 70–74 are in the same dovetail slots 60–64 that the blades 70–74 were originally in when blades 70–74 were measured for tip clearance.

FIG. 3B illustrates schematically that blade 30 shown in FIG. 3A has been machined to have an adequate tip clearance prior to coating. The blade 30 in FIG. 3B is indicated as having a length of $l_B$, where $l_B$ is the predetermined length for a blade 10 assembled in turbine disk 20 to have an adequate tip clearance. It will also be understood by those skilled in the art that length $l_B$ is a toleranced dimension, that is, it falls within predetermined tolerance limits after x amount of material has been removed from blade 30 of FIG. 3A.

Alternatively, after the blades 10 that do not have adequate tip clearance are machined and all blades 10 reassembled on the turbine disk 20, any required oxidation-resistant or protective coatings can be applied as assembled. The oxidation-resistant or protective coatings include environmental (bond) coatings and TBC systems. The reassembly of the blades 10 into their original dovetail slots 22 on the turbine disk 20 where the blades 10 were originally measured from results in all the blades 10 having adequate tip clearance. If the blades 10 are not reassembled into their original dovetail slots 22 on the turbine disk 20, several of the blades 10 may not have adequate tip clearance control due to the blades 10 being machined from measurements based on different datum or reference points, each dovetail slot 22 being a unique datum. Thus, a blade 10 assembled in a different dovetail slot 22 can have different clearances due to tolerance stack-up considerations.

In another embodiment, blades 10 can remain assembled in the turbine disk 20. Only those blades 10 that do not have adequate tip clearance control will have their corresponding blade tips 12 machined to achieve adequate tip clearance control. In this embodiment, the preferred technique for machining the blades 10 is grinding, however other techniques can be used. The blades 10 can then be removed for application of the environmental coating after recording the location of each blade on the turbine disk or the blades 10 can receive the environmental coating in-situ, that is, while assembled in the turbine disk 20.

The required areas of the airfoils 10 are coated with an environmental or bond coating using standard production methods well known in the art. Bond coats and overlay layers are usually metallic compositions, including aluminides of platinum, nickel and combinations thereof, aluminum, and MCrAlX where M is an element selected from the group consisting of nickel, iron, cobalt and combinations thereof and X is an element selected from the group consisting of yttrium, zirconium and combinations thereof. In a preferred embodiment of the present invention, the bond coats and overlay layers have a NiAl based composition (preferably a beta phase NiAl based composition). The areas of the airfoil 10 that can receive an environmental coating include the platform 15 and the areas 17 below platform 15 (see FIG. 1) through to the tip 12 of the airfoil 10. In addition, selected areas of the airfoil 10, usually the tip 12 and regions in proximity to the tip 12, are coated with a thermal barrier coating (TBC) using standard production methods well known in the art.

FIG. 3C illustrates schematically that blade 30 shown in FIG. 3B has received an environmental coating 32 and a TBC coating 34. The environmental coating 32 and TBC coating 34 can preferably be applied to the blade 30 when blade 30 is disassembled from the turbine disk. The blade 30 in FIG. 3C is indicated as having a length of $l_C$, where $l_C$ is the predetermined length for a blade 10 with TBC and environmental coating assembled in turbine disk 20 to have an adequate tip clearance.

In a second embodiment of the present invention, the turbine blades or airfoils 10 are again cast and machined to within manufacturing tolerances using conventional procedures well known in the art. The blades 10 are also assembled into dovetail slots 22 on the turbine disk 20 as in the first embodiment. Next, each assembled blade 10 is measured using conventional procedures well known in the art. The measurement of each assembled blade 10 is recorded.

Figure 4A:
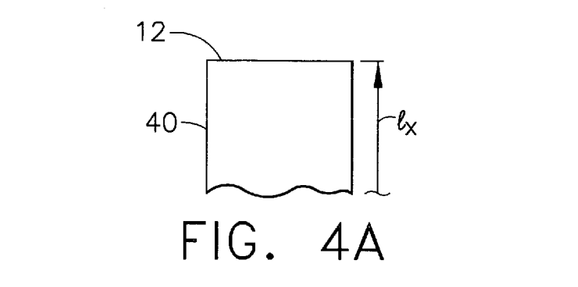
FIGS. 4A–4C illustrate turbine blade measurements in a second embodiment of the present invention.
Figure 4B:
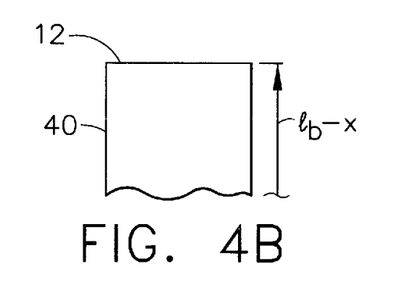
Figure 4C:
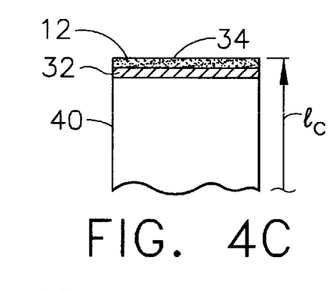

FIGS. 4A–4C illustrate schematically the process used in the second embodiment of the present invention. FIG. 4A illustrates schematically a blade 40 having been measured to determine its length. The blade 40 shown in FIG. 4A is indicated as having a length of $l_X$, where $l_X$ is the measured length for a blade 10 assembled in turbine disk 20. The length of $l_X$ can either be larger or smaller than the length of $l_B$.

After each blade 10 is measured, each blade tip 12 is then machined, preferably by rotor grinding, using the measurement for each blade 10 previously recorded so as to be slightly shorter than the predetermined adequate tip clearance control. However, blades 10 that are already shorter than the predetermined adequate tip clearance control may not require machining. The blades 10 are preferably machined to be 0.002–0.010 inches shorter than required for adequate tip clearance.

FIG. 4B illustrates schematically that blade 40 shown in FIG. 4A has been machined to have a length shorter than required for adequate tip clearance. The blade 40 in FIG. 4B is indicated as having a length of $l_B - x$, where $l_B$ is the predetermined length for a blade 10 assembled in turbine disk 20 to have an adequate tip clearance and x is an unknown length about 0.002–0.010 inches in length. That is, the blade 40 is undersized by about 0.002–0.010 inches.

After the blades 10 have been machined to have a length shorter than required for adequate tip clearance, the blade tips 12 are then built up to have adequate tip clearance control by applying extra protective coatings. The extra coatings applied to the blade tips 12 are preferably extra amounts of the environmental coatings and TBC, typically applied to the blade tips 12. The environmental coatings and TBC are applied using conventional procedures well known in the art. The thickness of the environmental coating and TBC applied to the blade tip 12 is controlled by varying the processing parameters controls. These extra coatings will have improved environmental resistance over the base material. Some techniques used to apply the coatings include, but are not limited to, thermal spray, welding or electroplating. In the case where only an environmental coating is applied, subsequent machining may be necessary after application of the environmental coating to reshape areas of the blade tip 12 and achieve adequate tip clearance. An advantage of this specific embodiment is that an additional environmental coating applied to blade 40 is available to provide protection to the blade 40 even if an unexpected power excursion occurs during engine operation that causes an unplanned and unexpected rub resulting in material loss between lengths $l_B$ and $l_B$-x.

In another embodiment, the blades 10 are actually cast and machined to be slightly shorter than standard manufacturing tolerances, so that when the blades 10 are assembled into the turbine disk 20, the blade tips 12 are 0.002–0.010 inches shorter than standard tip clearances (see FIG. 4B). The blades 10 are then assembled into dovetail slots 22 of a turbine disk 20. Each blade tip 12 is then measured to confirm that it is 0.002–0.010 inches shorter than standard tip clearance. Those blade tips 12 that are not 0.002–0.010 inches shorter than standard tip clearance can be machined, preferably rotor ground, to be 0.002–0.010 inches shorter than standard tip clearance. The blade tips 12 then receive the extra coatings as described above to obtain adequate tip clearance.

FIG. 4C illustrates schematically that blade 40 shown in FIG. 4B has received an environmental coating 32 and a TBC 34. The blade 40 in FIG. 4C is indicated as having a length of $l_C$, where $l_C$ is the predetermined length for a blade 10 with environmental and TBC coatings assembled in turbine disk 20 to have an adequate tip clearance.

In a third embodiment of the present invention, the turbine blades or airfoils 10 are again cast and machined to within manufacturing tolerances using conventional procedures well known in the art. Environmental and TBC coatings are applied to the blades 10 using standard production methods well known in the art. The turbine blades 10 are assembled into dovetail slots 22 in the turbine disk 20. The coated turbine blades 10 assembled in the turbine disk 20 are then measured for adequate tip clearance using standard techniques well known in the art.

Figure 5A:
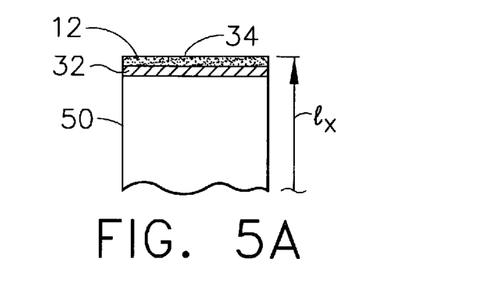
FIGS. 5A–5C illustrate turbine blade measurements in a third embodiment of the present invention.
Figure 5B:
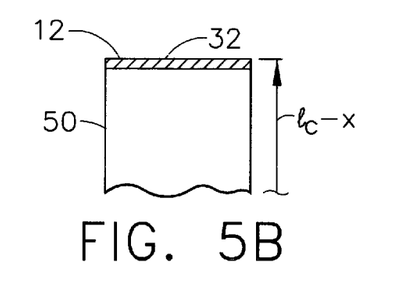
Figure 5C:
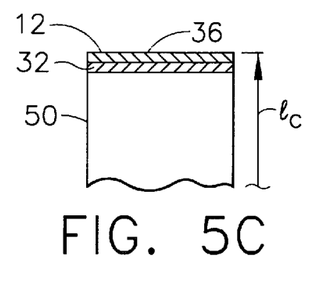

FIGS. 5A–5C illustrate schematically the process used in the third embodiment of the present invention. FIG. 5A illustrates schematically a blade 50 that has been coated with an environmental coating 32 and TBC system 34 and measured to determine its length. The blade 50 shown in FIG. 5A is indicated as having a length of $l_X$, where $l_X$ is the measured length for a coated blade 10 assembled in turbine disk 20. The length of $l_X$ can either be larger or smaller than the required length of $l_C$.

The coated blades 10 that are measured as not having adequate tip clearance are then machined, preferably rotor ground, to achieve adequate tip clearance. Preferably, after completion of the machining, the blade tips 12 should be very slightly shorter than necessary for adequate tip clearance. The machining of the blades 10 can remove some or all of any TBC coating that has been applied to the blade 10. In addition, the machining may also remove some of the environmental coating and even possibly some of the base material of the blade 10. Removal of material from the blades 10 also can be accomplished by cycling the engine through engine transients. When engine cycling is used to remove material from the blades 10, portions of the blade 10 can have TBC coating and environmental coating removed while other portions of the blade 10 do not have TBC coating and environmental coating removed. In other words, once a blade 10 has completed an engine cycle, portions of the blade 10 can have the TBC coating and environmental coatings removed, while the TBC coating and environmental coating on other portions of the blade 10 can be unaffected.

FIG. 5B illustrates schematically that blade 50 shown in FIG. 5A has had material removed so that it has a length shorter than required for adequate tip clearance. The blade 50 in FIG. 5B is indicated as having a length of $l_C$-x, where $l_C$ is the predetermined length for a blade 10 with environmental and TBC systems assembled in turbine disk 20 to have an adequate tip clearance and x is a length between about 0.002–0.010 inches.

To achieve adequate tip clearance control and to restore at least a protective environmental coating for each of the blades 10, a slurry containing some quantity of aluminum or aluminum and reactive elements can then be applied to affected blade tips 12. The blade tip 12 is then heated to an elevated temperature using standard techniques to permit diffusion of the aluminum into the blade tip 12 to enhance the environmental resistance of the blade tip 12 and provide a diffusion coating. However, in a preferred embodiment of the present invention, the slurry can contain platinum or more preferably, platinum and reactive elements such as hafnium, zirconium and yttrium, which would then be diffused into the blade tip 12 on heating of the blade tip 12 to form a diffusion coating. The slurry can be applied to those portions of the blade 10 that have TBC coating and/or environmental coating removed by cycling the engine and to any coatings. The slurry can also be applied to those portions of the blade 10 that still have some TBC coating or environmental coating present on the blade tip 12 after the blade 10 has completed an engine cycle. It is also possible to apply an oxidation resistant additive overlay coating, e.g. a NiAl based composition or MCrAlX, to that area by thermal spray processes such as hyper-velocity oxy-fuel (HVOF), low pressure plasma spray (LPPS), air plasma spray (APS), or by physical vapor deposition processes such as electron beam (EB-PVD), cathodic arc and sputtering.

FIG. 5C illustrates schematically that blade 50 shown in FIG. 5B has received a slurry coating 36 in addition to an environmental coating 32. The blade 50 in FIG. 5C is indicated as having a length of $l_C$, where $l_C$ is the predetermined length for a coated blade 10 assembled in turbine disk 20 to have an adequate tip clearance.

It is to be understood that the environmental coatings and TBC illustrated only on the blade tip 12 in FIGS. 3C, 4C and 5A–5C are applied to other areas of the turbine blade as required and in accordance with coating practices well known in the art.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of processing turbine blades to reduce wear of applied coatings from tips of the turbine blades during engine operation, the method comprising the steps of:
    assembling a plurality of turbine blades onto a turbine disk;
    determining a set of turbine blades of the plurality of turbine blades not having a predetermined adequate tip clearance;
    removing material from the set of turbine blades to achieve the predetermined adequate tip clearance; and
    applying a thermal barrier coating system to the plurality of turbine blades.

2. The method of claim 1 further comprising:
    disassembling the plurality of turbine blades from the turbine disk before said step of removing material;
    applying the thermal barrier coating system to the plurality of turbine blades after said step of removing material; and
    reassembling the plurality of turbine blades into the turbine disk after said step of applying the thermal barrier coating system.

3. The method of claim 2 further comprising:
    recording a position on the turbine disk of each turbine blade of the plurality of turbine blades before said step of disassembling; and
    reassembling the plurality of turbine blades into the turbine disk after said step of applying the thermal barrier coating system using the recorded position information for each turbine blade from said step of recording.

4. The method of claim 1 wherein said step of removing material includes rotor grinding the set of turbine blades to achieve the predetermined adequate tip clearance.

5. The method of claim 1 wherein the step of applying a thermal barrier coating system includes applying a bond coating and a thermal barrier coating to each of the plurality of turbine blades.

6. The method of claim 5 wherein the bond coating comprises a NiAl based composition.

7. The method of claim 1 further comprising measuring each turbine blade of the plurality of turbine blades assembled on the turbine disk for predetermined adequate tip clearance.

8. A method of processing turbine airfoils to reduce wear of applied coatings from tips of the turbine airfoils during engine operation, the method comprising the steps of:
    assembling a plurality of turbine airfoils onto a turbine disk;
    measuring each turbine airfoil of the plurality of turbine airfoils assembled on the turbine disk;
    manufacturing each turbine airfoil of the plurality of turbine airfoils to a length less than that required for a predetermined adequate tip clearance; and
    applying a thermal barrier coating system to the plurality of turbine airfoils to achieve the predetermined adequate tip clearance for each turbine airfoil of the plurality of turbine airfoils.

9. The method of claim 8 wherein the step of manufacturing includes machining each turbine airfoil of the plurality of turbine airfoils to a length less than that required for the predetermined adequate tip clearance.

10. The method of claim 9 wherein the step of manufacturing includes rotor grinding each turbine airfoil of the plurality of turbine airfoils to a length less than that required for the predetermined adequate tip clearance.

11. The method of claim 8 wherein the step of manufacturing includes casting each turbine airfoil of the plurality of turbine airfoils to have a length smaller than required to achieve the predetermined adequate tip clearance for the plurality of turbine airfoils.

12. The method of claim 8 wherein the step of applying a thermal barrier coating system includes applying an environmental coating and a thermal barrier coating to the turbine airfoils to achieve the predetermined adequate tip clearance.

13. The method of claim 12 wherein the environmental coating comprises a NiAl based composition.

14. A method of processing turbine blades for a predetermined adequate tip clearance, the method comprising the steps of:
    applying a thermal barrier coating system to a plurality of turbine blades;
    assembling the plurality of turbine blades onto a turbine disk;
    removing material from a set of turbine blades not having the predetermined adequate tip clearance; and
    applying a protective coating to each turbine blade of the set of turbine blades to restore an environmental coating to each turbine blade of the set of turbine blades.

15. The method of claim 14 further comprising measuring each turbine blade of the plurality of turbine blades assembled on the turbine disk to determine the set of turbine blades not having the predetermined adequate tip clearance.

16. The method of claim 14 wherein the step of applying a protective coating includes applying a slurry to blade tips of the set of turbine blades.

17. The method of claim 16 further comprising:
    the slurry comprises one of aluminum, platinum, platinum and reactive elements and aluminum and reactive elements; and
    applying a heat-treatment to each blade tip of the set of turbine blades to form a diffusion coating.

18. The method of claim 14 wherein said step of applying a protective coating includes applying an overlay coating to blade tips of the set of turbine blades by one of thermal spray and physical vapor deposition.

19. The method of claim 14 wherein the step of removing material includes the additional steps of:
    assembling the turbine disk including the plurality of turbine blades into a turbine engine;
    cycling the turbine engine through temperature transients; and
    inspecting each turbine blade of the plurality of turbine blades to ascertain whether the thermal barrier coating system was removed while the turbine engine was cycled.

20. The method of claim 14 wherein:
    the step of removing material includes the steps of:
        removing the thermal barrier coating system from the set of turbine blades; and exposing a base material of each turbine blade of the set of turbine blades; and the step of applying a protective coating includes applying the protective coating to the exposed base material of each turbine blade of the set of turbine blades to restore an environmental coating to each turbine blade of the set of turbine blades that had the thermal barrier coating system removed.

* * * * *